(12) United States Patent
Corral-Soto

(10) Patent No.: US 8,718,407 B2
(45) Date of Patent: May 6, 2014

(54) HIGH-QUALITY SINGLE-FRAME SUPERRESOLUTION TRAINING AND RECONSTRUCTION ENGINE

(75) Inventor: Eduardo R. Corral-Soto, Toronto (CA)

(73) Assignee: STMicroelectronics (Canada), Inc., Ontario (CA)

( * ) Notice: Subject to any disclaimer, the term of this patent is extended or adjusted under 35 U.S.C. 154(b) by 182 days.

(21) Appl. No.: 13/340,272

(22) Filed: Dec. 29, 2011

(65) Prior Publication Data

US 2013/0128111 A1   May 23, 2013

Related U.S. Application Data

(60) Provisional application No. 61/561,746, filed on Nov. 18, 2011.

(51) Int. Cl.
| | | |
|---|---|---|
| *G06K 9/32* | (2006.01) | |
| *G06K 9/62* | (2006.01) | |
| *G06K 15/02* | (2006.01) | |

(52) U.S. Cl.
USPC .............................. 382/299; 382/224; 358/1.2

(58) Field of Classification Search
USPC ......... 382/224, 254, 299–300, 284, 305, 312; 375/240.11; 358/1.2, 3.27, 525, 528, 358/540; 345/606, 629, 660; 348/441
See application file for complete search history.

(56) References Cited

U.S. PATENT DOCUMENTS

| | | | |
|---|---|---|---|
| 7,379,612 B2 * | 5/2008 | Milanfar et al. | ............... 382/254 |
| 7,428,006 B2 * | 9/2008 | Watanabe | .................. 348/218.1 |
| 7,499,108 B2 * | 3/2009 | Kii | ................................ 348/586 |
| 7,715,477 B2 * | 5/2010 | Garrido et al. | ........... 375/240.11 |
| 8,150,210 B2 * | 4/2012 | Chen et al. | .................... 382/284 |

* cited by examiner

*Primary Examiner* — Kanjibhai Patel
(74) *Attorney, Agent, or Firm* — Munck Wilson Mandala, LLP

(57) ABSTRACT

An image processing system includes an image reconstruction unit. The image reconstruction unit is configured to receive an image at a first resolution, apply the image to a look-up table and output a version of the image at a second resolution. The second resolution includes a higher resolution than the first resolution. In addition, the look-up table is generated inputting a plurality of training images; classifying, into a number of classes, a plurality of images patches corresponding to each of the plurality of training images; re-classifying the number of classes into a final class; and synthesizing filters corresponding to each of the class into a final filter value.

20 Claims, 4 Drawing Sheets

HIGH-QUALITY SINGLE-FRAME SUPERRESOLUTION TRAINING AND RECONSTRUCTION ENGINE

CROSS-REFERENCE TO RELATED APPLICATION(S) AND CLAIM OF PRIORITY

The present application is related to U.S. Provisional Patent No. 61/561,746, filed Nov. 18, 2011, entitled "HIGH-QUALITY SINGLE-FRAME SUPERRESOLUTION TRAINING AND RECONSTRUCTION ENGINE". Provisional Patent No. 61/561,746 is assigned to the assignee of the present application and is hereby incorporated by reference into the present application as if fully set forth herein. The present application hereby claims priority under 35 U.S.C. §119(e) to U.S. Provisional Patent No. 61/561,746.

TECHNICAL FIELD

The present invention relates generally to image reconstruction, and more particularly to single frame superresolution reconstruction.

BACKGROUND

A variety of image formats are known. For example, many image systems today utilize a high definition (HD) resolution image. However, many users have image files, such as videos, that are in a standard definition (SD) format. An SD image viewed on an HD image system, such as an HD television, appears fuzzy, blurred, or "soft."

SUMMARY

Other technical features may be readily apparent to one skilled in the art from the following figures, descriptions, and claims.

In a first embodiment, an image processing system includes an image reconstruction unit. The image reconstruction unit is configured to receive an image at a first resolution, apply the image to a look-up table and output a version of the image at a second resolution. The second resolution includes a higher resolution than the first resolution. In addition, the look-up table is generated based on a plurality of image patches that have been classified, reclassified and synthesized to form at least one codevector.

In a second embodiment, a method for generating a look-up table for use in an image processing system includes inputting a plurality of training images. The method also includes classifying, into a number of classes, a plurality of images patches corresponding to each of the plurality of training images. In addition, the method includes re-classifying the number of classes into a final class. Furthermore, the method includes synthesizing filters corresponding to each of the class into a final filter value.

In a third embodiment, a video processing system includes a memory configured to store video related information and processing circuitry configured to process the video related information to render an image. The processing circuitry includes an image reconstruction unit. The image reconstruction unit is configured to receive an image at a first resolution, apply the image to a look-up table and output a version of the image at a second resolution. The second resolution includes a higher resolution than the first resolution. In addition, the look-up table is generated based on a plurality of image patches that have been classified, reclassified and synthesized to form at least one codevector.

Before undertaking the DETAILED DESCRIPTION OF THE INVENTION below, it may be advantageous to set forth definitions of certain words and phrases used throughout this patent document. The term "packet" refers to any information-bearing communication signal, regardless of the format used for a particular communication signal. The terms "application," "program," and "routine" refer to one or more computer programs, sets of instructions, procedures, functions, objects, classes, instances, or related data adapted for implementation in a suitable computer language. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged imaging system.

Figure 1:
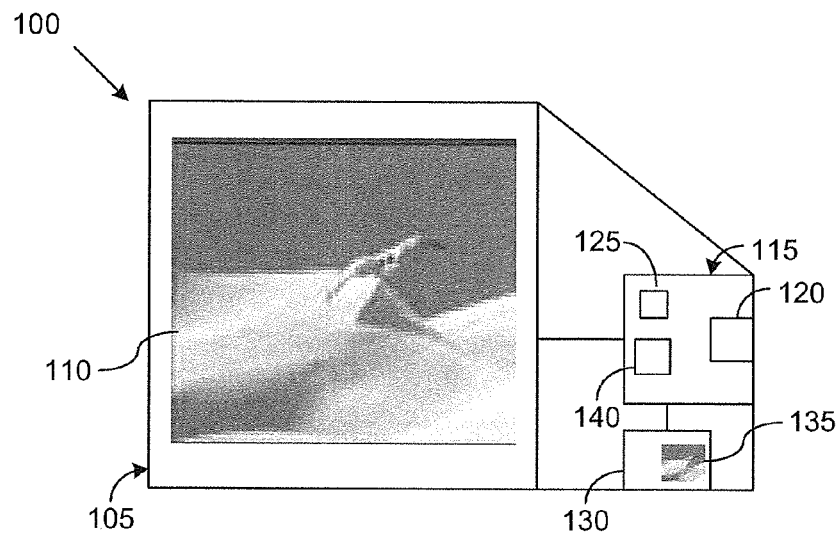
FIG. 1 illustrates an imaging system according to embodiments of the present disclosure.

FIG. 1 illustrates an imaging system according to embodiments of the present disclosure. The embodiment of the imaging system 100 shown in FIG. 1 is for illustration only. Other embodiments could be used without departing from the scope of this disclosure.

The imaging system 100 includes a display 105. Display 105 is capable of rendering, or otherwise displaying, a high definition (HD) image 110, such as a high definition video. For example, display 105 includes components necessary to provide image resolutions of 1,280×720 pixels (720p) or 1,920×1,080 pixels (1080i/1080p). The number of lines in the vertical display determine resolution. High-definition television (HDTV) resolution is 1,080 or 720 lines. The display 105 can include either a progressive scanning (p) or interlaced scanning (i) system.

The imaging system 100 also includes processing circuitry 115. The processing circuitry 105 can include a controller 120. As particular examples, the controller 120 may comprise a processor, a microprocessor, a microcontroller, a field programmable gate array, a digital signal processor (DSP), or any other processing or control device(s). The processing circuitry 115 can include a memory 125, which is coupled to the controller 120. The memory 125 stores any of a wide variety of information used, collected, or generated by the imaging system 100. For example, the memory 125 could store information transmitted over or received from a wired or wireless network, such as a satellite signal, cable signal, or internet signal. The memory 125 includes any suitable volatile and/or non-volatile storage and retrieval device(s). The processing circuitry 115 can process data, such as video imaging data, and cause the display 105 to render image 110 based on the data.

The imaging system 100 includes an interface 130. The interface 130 can receive video images 135, such as streaming video, for processing by the processing circuitry 115 and rendering by the display 105. In certain embodiments, the image 135 is generated via an external device, such as a digital video disc (DVD) player, coupled to the imaging system 100 via the interface 130. For example, the image 135 could be stored on a DVD. When inserted into the DVD player, the DVD player extracts the image 135 from the disc and transmits data related to the image 135 through the interface 130 for reconstruction and rendering by the imaging system 100. In certain embodiments, the image 135 is generated via an external signal, such as a satellite signal, coupled to the imaging system 100 via the interface 130.

In certain embodiments, the imaging system 100 also includes an image reconstruction unit 140. The image reconstruction unit 140 includes processing circuitry and a memory that enable the image reconstruction unit 140 to convert a standard definition (SD) image into an HD image. For example, the image reconstruction unit 140 can utilize a modified single-frame superresolution (SFSR) process to convert, or otherwise reconstruct, a low resolution (LR) SD image into a high resolution (HR) HD image. Additionally, the image reconstruction unit 140 can use the SFSR process to convert the SD image into the HD image by synthesizing or introducing high-frequency (close to Nyquist) details into the input image. In the SFSR process, the image reconstruction unit 140 uses codebooks and reconstruction filters that have been produced based on training schemes.

In certain embodiments, the image reconstruction unit 140 is included in the processing circuitry 115. In certain embodiments, the image reconstruction unit 140 is coupled to one or both of the processing circuitry 115 and memory 125. In certain embodiments, the imaging system 100 is one of: a television and a computer with display. In certain embodiments, the image reconstruction unit 140 is included in an external component, such as a DVD player, cable set-top box, satellite set-top box; or a computer.

Although FIG. 1 illustrates an example of an imaging system 100, various changes may be made to FIG. 1. For example, the imaging system 100 could include any number of its various components. Also, the functional divisions shown in FIG. 1 are for illustration only. Various components in FIG. 1 could be combined, subdivided, or omitted and additional components could be added according to particular needs.

Figure 2:
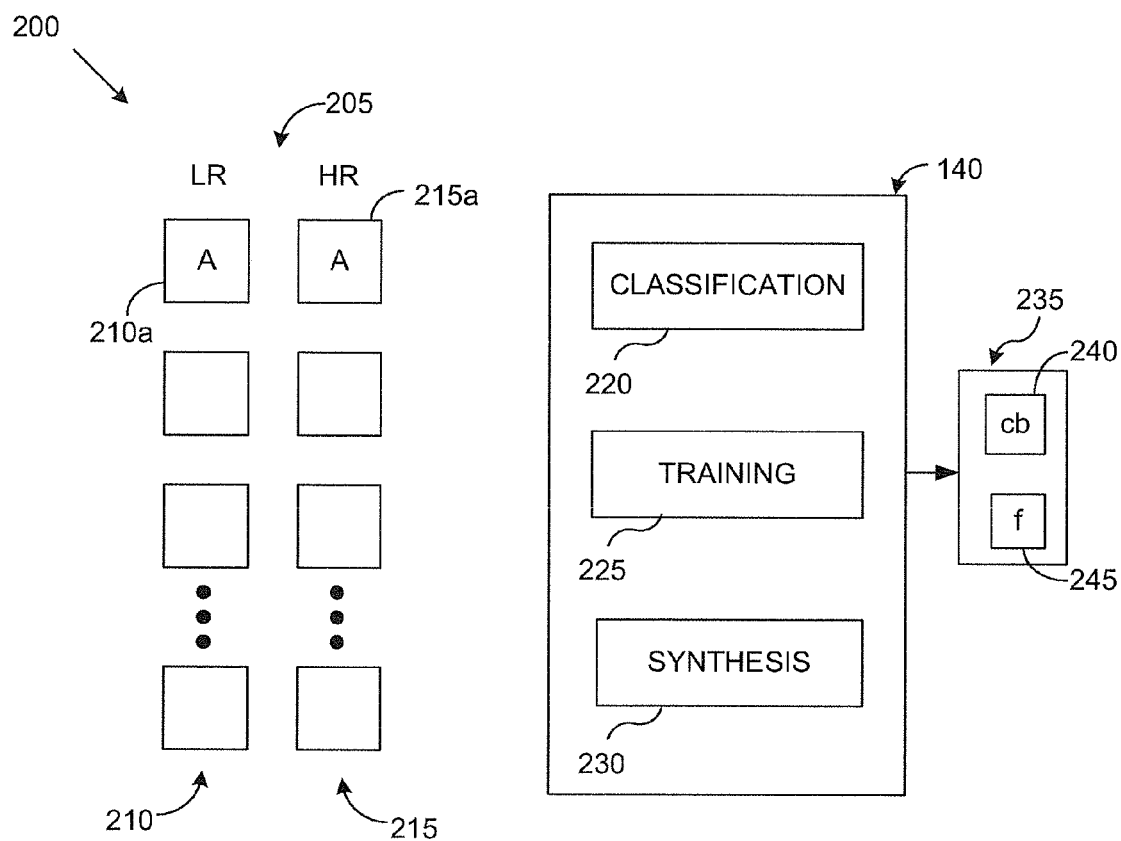
FIG. 2 illustrates a training stage for a single-frame superresolution system according to embodiments of the present disclosure.

FIG. 2 illustrates a training stage for a single-frame super-resolution system according to embodiments of the present disclosure. The embodiment of the training stage 200 for the SFSR system shown in FIG. 2 is for illustration only. Other embodiments could be used without departing from the scope of this disclosure.

The image reconstruction unit 140 is configured, via a training stage 200, to perform the SD to HD conversion. A plurality of training images 205 are input into the image reconstruction unit 140 during an off-line process. The training images 205 include two sets of "N" LR and HR images, where N is the total number of images in a set. A first set of images 210 are LR, or otherwise degraded version, of original images while a second set of images 215 are high resolution versions of the same original images. For example, a first original image "A" is provided to the image reconstruction unit 140, wherein an LR version 210a and an HR version 215a of the first original image are input to the image reconstruction unit 140. In the training stage 200, the image reconstruction unit 140 performs a classification process 220, a training process 225 and a synthesis process 230.

The training stage 200 produces a pair of look-up tables (LUT) 235 of size K×D, where K represents a number of codevectors (i.e., columns) and reconstruction filters and D represents the number of pixel elements (i.e., rows). The larger the values of K and D are, the wider the coverage is of image structures. However, in hardware implementations, the values of K and D dramatically affect both the number of gates and the required bandwidth. Accordingly, given a training-based superresolution system with a relatively small K, interpolation of classes and filters is performed based on the distances between incoming data patch and nearest fixed classes/filters in order to support an expanded set of image structures. In the training stage 225, a re-quantization is performed of codebooks (size Ko) generated from a large database of images in order to synthesize new codebooks and filter banks of size K. As such, the training process time is shortened. In the filter synthesis stage 230, a regularization term is used to reduce over-fitting-related artifacts, such as impulse noise in the reconstructed images. Thereafter, the image reconstruction unit 140 utilizes the LUT in a reconstruction stage to produce an improved resolution version of an original image input into the image reconstruction unit 140.

In certain embodiments, the training stage 200 is not included in the image reconstruction unit 140. For example, the training stage 200 could represent an external process used to program the image reconstruction unit 140. Additionally, the training stage 200 could be an external process that generates the LUT, which includes codebooks 240 and filters 245. The training stage 200 provides the LUT to the image reconstruction unit 140, which stores the LUT in a memory. Thereafter, the image reconstruction unit 140 utilizes the LUT 235 in a reconstruction stage.

In certain embodiments, different training images are utilized to generate different LUTs 235. For example, an operator may desire a different LUT 235 for a particular application. Accordingly, the operator may provide a certain set of training images configured to generate the different LUT.

Embodiments of training stage 200 generate LUTs 235 with codebooks 240 and filters 245 for use in SFSR conversion of an LR image into a HR resolution image. The LUTs 235 are configured to improve details and a structure of reconstructed images. Additionally, in certain embodiments, the speed and flexibility of the training process are improved. Further, the training stage 200 is configured to reduce or eliminate over-fitting-related artifacts, such as impulse noise, in the reconstructed images.

Although FIG. 2 illustrates an example of a training stage 200, various changes may be made to FIG. 2. For example, the training stage 200 could include any number of its various steps, processes or components. Also, the functional divisions shown in FIG. 2 are for illustration only. Various steps, processes or components in FIG. 2 could be combined, subdivided, or omitted and additional components could be added according to particular needs.

Figure 3:
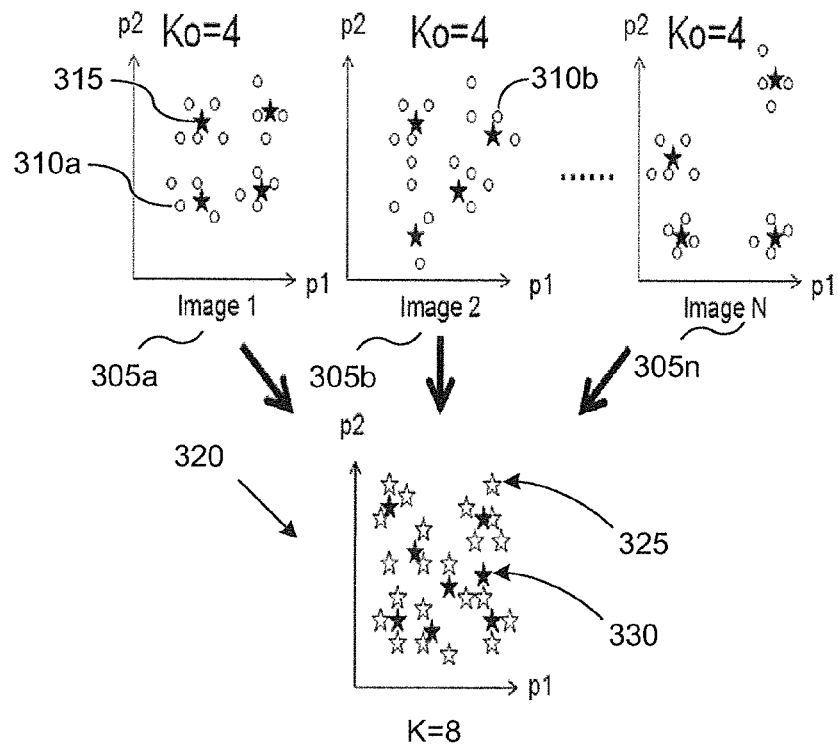
FIGS. 3 and 4 illustrate a classification and training process utilized by the image reconstruction unit to generate a LUT with codebooks and filters according to embodiments of the present disclosure.
Figure 4:
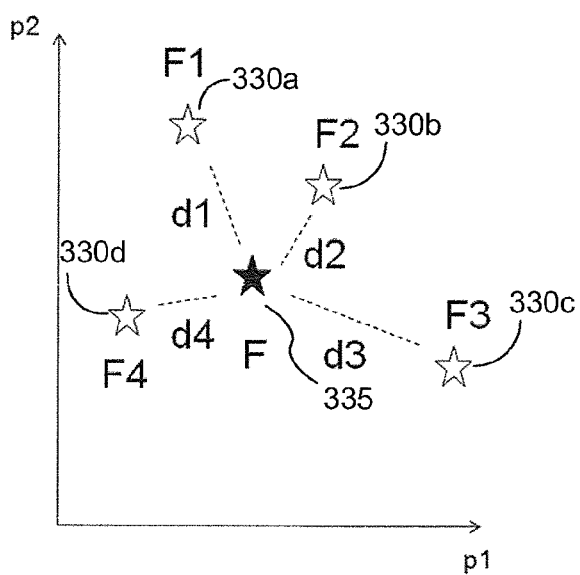

FIGS. 3 and 4 illustrate a classification and training process utilized by the image reconstruction unit to generate a LUT with codebooks and filters according to embodiments of the present disclosure. The embodiment of the classification and training processes shown in FIGS. 3 and 4 are for illustration only. Other embodiments could be used without departing from the scope of this disclosure.

In the classification stage 220, image patches from each individual image are classified to form individual codebooks and filters 305a-305n for each image. The image patches from each individual image are initially classified into Ko classes. For example, a first set of image patches 310 (illustrated as circles in FIG. 3) are classified into a first set of classes 315 (illustrated as stars in FIG. 3) where Ko=4. Additionally, a second set of image patches 310b (illustrated as circles in FIG. 3) are classified into a second set of classes 310b (illustrated as stars in FIG. 3) where Ko=4, and so forth. It is understood that Ko=4 is for illustration only and other values for Ko could be used without departing from the scope of this disclosure. A corresponding set of Ko reconstruction filters are generated for each image. In this case, Ko can be smaller than the final K size utilized in the reconstruction stage. By using a Ko<K, the required time to produce the individual codebooks and filters is reduced considerably. Accordingly, an initial training can be performed on a very large set of image pairs.

The training process 225 performs re-quantization of codebooks (size Ko) generated from a large database of images in order to synthesize new codebooks and filter banks of size K. After the initial training in the classification stage 220 is performed, the training stage 225 combines the set of individual codebooks and filters together into a new set of look-up tables of size K×D. The training stage 225 combines the set of individual codebooks and filters 305a-305n together by treating the individual codevectors as new image patches. Then, the training stage 225 performs a re-classification on the individual codebooks and filters 305a-305n. For example, each set of initial classes 310 (illustrated as white stars 325 in the codebook and filter bank 320) is classified into a final class 330 (illustrated as black stars in FIG. 3) where K=8. It is understood that K=8 is for illustration only and other values for K could be used without departing from the scope of this disclosure. This re-classification is coupled with the appropriate blending of individual reconstruction filters.

In the classification 220 and training 225 processes, after the initial classes are combined in to a final class, the filters associated to the initial classes also have to be combined. For example, the filters can be combined using:

$$F = \sum_{n=1}^{Q} w_n F_n \quad (1)$$

where F symbolizes a filter, Q is the number of initial filters that are being combined, and w symbolizes a weight, which depends on the distance d as follows:

$$w_n = \frac{d_n}{\sum_n d_n} \quad (2)$$

Therefore, as shown in FIG. 4, each of the filters 330 is averaged. However, the final filter value "F" 335 is a weighted average based on distance of the d1, d2, d3 and d4 for the initial filters 330. For example, when F1 330a, F2 330b, F3 330c and F4 330d are averaged, the distance d3 that F3 330c is from the other filters causes the contribution (e.g., weight) from F3 330c to be reduced as compared to the other filters F1 330a, F2 330b and F4 330d. By applying a weighting factor based on distance, the training stage 200 can reduce or eliminate effects caused by an anomaly, which might skew the final image. That is, the averaging performed by the blending of filters in the classification 220 and training 225 stages reduces or eliminates over-fitting-related artifacts, such as impulse noise, in the reconstructed images The reconstructed filters are synthesized on the synthesis stage 230. The synthesis of the reconstruction filters can be performed regardless of the classification and blending schemes described above. However, if the synthesis is not performed carefully, the resulting images may contain impulse noise artifacts related to the unconstrained nature of the synthesized filter coefficients.

In certain embodiments, the synthesis stage 230 is configured to minimize a cost function with the following form with respect to the set of filter coefficients g using the following:

$$C = \Sigma \rho_1(f(\vec{g})) + \lambda \rho_2(h(\vec{g})) \quad (3)$$

In equation 3, C is a cost function, $\rho_1$ is a fidelity (or data) term and $\lambda \rho_2$ is the regularization term. Specifically, the synthesis stage introduces a smoothness term ($\lambda \rho_2(h(\vec{g}))$, that is, the second term in the equation) which is controlled by the parameter $\lambda$.

Although FIGS. 3 and 4 illustrate an example of the combination 220, training 225 and synthesis 230 processes in the training stage 200, various changes may be made to FIGS. 3 and 4. For example, the training stage 200 could include any number of its various steps, processes or components. Also, the functional divisions shown in FIGS. 3 and 4 are for illustration only. Various steps, processes or components in FIGS. 3 and 4 could be combined, subdivided, or omitted and additional components could be added according to particular needs.

Figure 5:
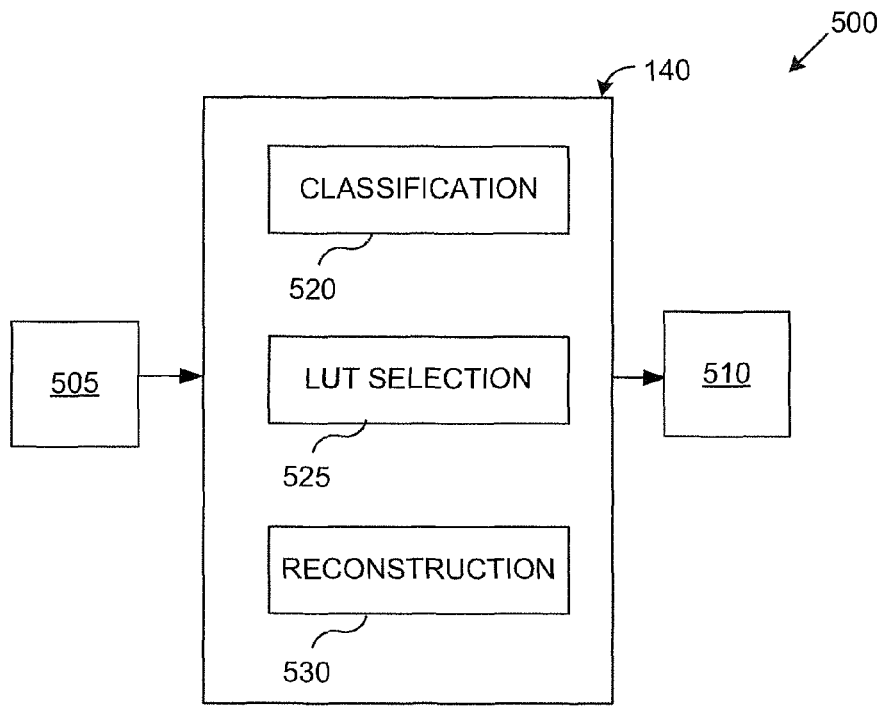
FIG. 5 illustrates a single-frame superresolution system according to embodiments of the present disclosure.

FIG. 5 illustrates a single-frame superresolution system according to embodiments of the present disclosure. The embodiment of the SFSR system 140 shown in FIG. 5 is for illustration only. Other embodiments could be used without departing from the scope of this disclosure.

After the LUTs 235 are generated in the training stage 200, the image reconstruction unit 140 can perform a reconstruction stage 500 using the LUTs 235. In the reconstruction stage 500, the image reconstruction unit 140 can utilize processes similar to those used in the training stage 200 to improve an image structure of an input image 505 and provide an output image 510 at a higher resolution.

The image reconstruction unit 140 receives an image 505. The image 505 is a low resolution, or otherwise degraded, input image. The image reconstruction unit 140 applies a classification process 520 to the image 505. In the classification stage 520, image patches from the image 505 are classified. The image patches from each individual image are initially classified into Ko classes.

Once the image 505 has been classified, the image reconstruction unit 140 selects the LUT 235 to be used to improve the image structure of the image 505. The image reconstruction unit 140 selects one of the LUTs 235 from a memory. The LUTs 235 were previously generated offline in the training stage 200 and stored in the memory. The LUTs 235 include at least a codebook 240 and filters 245.

After the LUT 235 is selected, the image reconstruction unit 140 performs a reconstruction process 530. In the reconstruction process 530, the selected LUT 235 is applied to the image 505 to generate the output image 510. That is, at least one of the codebook 240 and filter 245 is applied to the image 505 such that the image reconstruction unit 140 can introduce or synthesize high-frequency (such as, close to Nyquist) details into the input image 505. Accordingly, the image reconstruction unit 140 uses the LUTs 235 in order to generate the output image 510. The output image 510 is a high resolution version of the input image 505.

Although FIG. 5 illustrates an example of a reconstruction stage 500, various changes may be made to FIG. 5. For example, the reconstruction stage 500 could include any number of its various steps, processes or components. Also, the functional divisions shown in FIG. 5 are for illustration only. Various steps, processes or components in FIG. 5 could be combined, subdivided, or omitted and additional components could be added according to particular needs.

Figure 6:
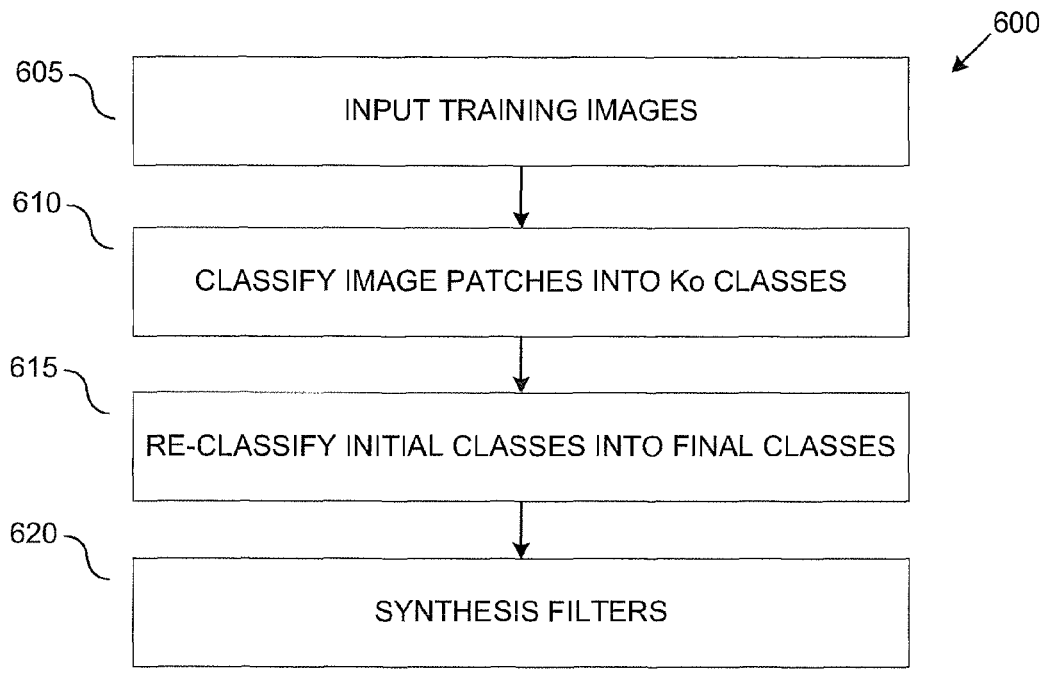
FIG. 6 illustrates a process for generating a look-up table according to embodiments of the present disclosure.

FIG. 6 illustrates a process for generating a look-up table according to embodiments of the present disclosure. The embodiment of the process 600 shown in FIG. 6 is for illustration only. Other embodiments could be used without departing from the scope of this disclosure. For example, while shown as a series of steps, various steps in FIG. 6 could overlap, occur in parallel, occur multiple times, or occur in a different order.

In step 605, a plurality of input images are input into the image reconstruction unit 140. The training images 205 are input into the image reconstruction unit 140 during an off-line process. For example, the training images 205 can be input into the image reconstruction unit 140 during a manufacture of the image reconstruction unit 140. The training images 205 include two sets of "N" LR and HR images, where N is the total number of images in a set. A first set of images 210 are LR, or otherwise degraded version, of original images while a second set of images 215 are high resolution versions of the same original images. For example, a first original image "A" is provided to the image reconstruction unit 140, wherein an LR version 210a and an HR version 215a of the first original image are input to the image reconstruction unit 140.

Image patches for each of the training images 205 are classified in step 610. The image patches from each individual image are classified to form individual codebooks and filters for each image. The image patches from each individual image are initially classified into Ko classes. A corresponding set of Ko reconstruction filters are generated for each image. In this case, Ko can be smaller than the final K size utilized in the reconstruction stage. By using a Ko<K, the required time to produce the individual codebooks and filters is reduced considerably. Accordingly, an initial training can be performed on a very large set of image pairs.

In step 615, the initial classes are re-classified into final classes. The sets of individual codebooks and filters are collected in order to combine them together into a new set of LUTs 235 of size K×D. The combination is performed by treating the individual codevectors as new image patches and performing a re-quantization of codebooks (size Ko) generated from a large database of images in order to synthesize new codebooks and filter banks of size K. This re-classification is coupled with the appropriate blending of individual reconstruction filters. In addition, after the initial classes are combined in to a final class, the filters associated to the initial classes also are combined. The final filter value "F" is a weighted average based on distance of the initial filters.

In step 620, the reconstructed filters are synthesized. The synthesis of the reconstruction filters can be performed regardless of the classification and blending schemes described above. However, if the synthesis is not performed carefully, the resulting images may contain impulse noise artifacts related to the unconstrained nature of the synthesized filter coefficients. Therefore, during synthesis, a cost function is minimized by regularizing the filters synthesis.

Figure 7:
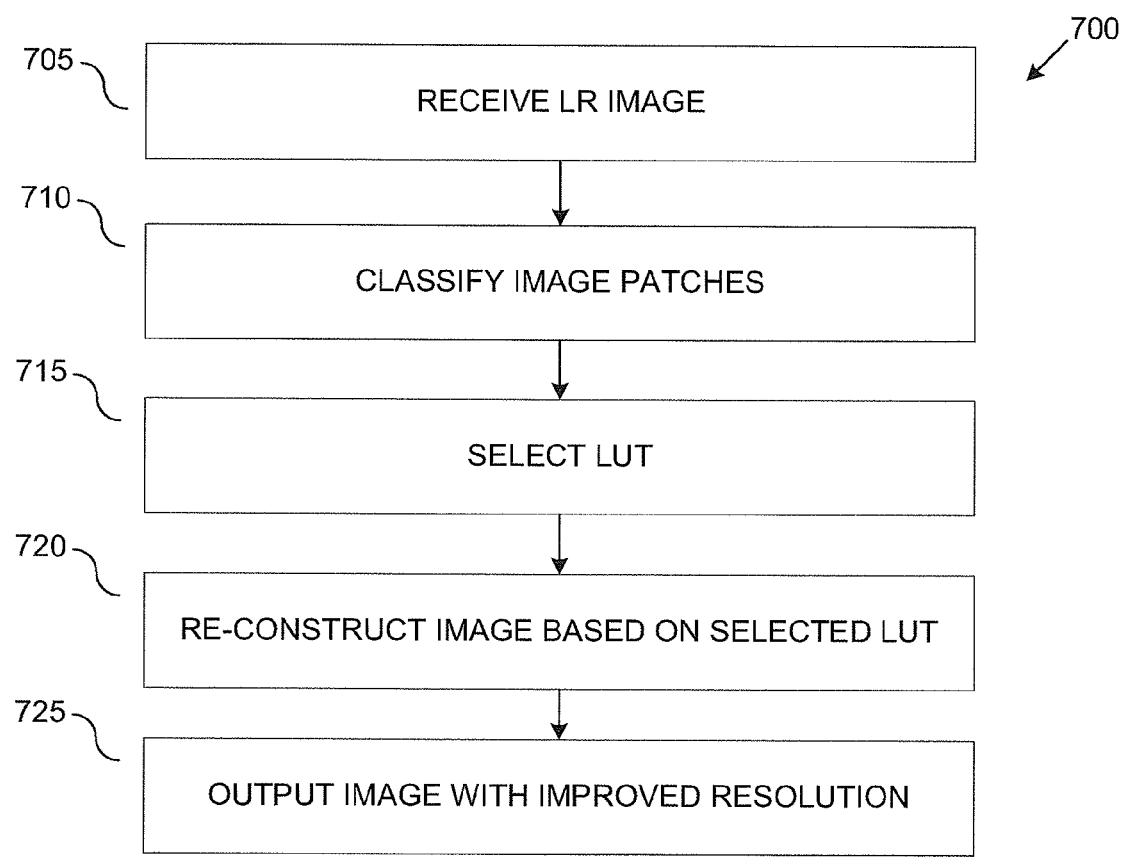
FIG. 7 illustrates a process for improving a resolution of an image according to embodiments of the present disclosure.

FIG. 7 illustrates a process for improving a resolution of an image according to embodiments of the present disclosure. The embodiment of the process 700 shown in FIG. 7 is for illustration only. Other embodiments could be used without departing from the scope of this disclosure. For example, while shown as a series of steps, various steps in FIG. 7 could overlap, occur in parallel, occur multiple times, or occur in a different order.

In step 705 an input image is received. The input image is a low resolution, or otherwise degraded, input image. In step 710, image patches from the input image are classified. For example, the image patches from each individual image are initially classified into Ko classes. In step 715, a LUT is selected, such as based on the classification of the image in step 710, to be used to improve the image structure of the input image. In step 720, the image is reconstructed based on the selected LUT. The selected LUT 235 is applied to the input image to generate an improved version of the image as an output image 510. That is, at least one of a codebook and filter is applied to the input image such that high-frequency (such as, close to Nyquist) details are introduced or synthesized into the input image. In step 725, an image with improved image quality over the input image is output. The output image can be a high resolution version of the input image.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An image processor, comprising:
an image reconstruction unit configured to receive an image at a first resolution, to classify image patches from the image into classes, to select a codebook and regularized filters to apply to the image from a look-up table based on classification of the image patches, and to apply the selected codebook and regularized filters to the image to introduce additional image details and output a version of the image at a second resolution without impulse noise artifacts related to unconstrained filter coefficients,
wherein the second resolution comprises a higher resolution than the first resolution.

2. The image processor according to claim 1, wherein look-up table is further generated based on a minimization function configured to minimize a cost function, the minimization term comprising:

$$C=\Sigma\rho_1(f(\vec{g}))+\lambda\rho_2(h(\vec{g})),$$

wherein C is a cost function, $\vec{g}$ are filter coefficients, $\rho_1$ is a data term, and $\lambda\rho_2$ is a regularization term, and $\lambda\rho_2(h(\vec{g}))$ is a smoothness term.

3. The image processor according to claim 1, wherein the image patches are classified to identify a plurality of codebooks and filters for increasing a resolution of the image, and wherein the lookup table is generating by combining the plurality of codebooks together using codevectors derived based upon a plurality of training images and reclassifying the combined codebooks into a final class.

4. The image processor according to claim 3, wherein reclassifying the combined codebooks comprises applying a weighted filter average, the weighted filter average based on a distance of a filter from a cluster of filters for the plurality of codebooks to be combined.

5. The image processor according to claim 1, wherein the image reconstruction unit is configured to introduce high frequency details into the received image to output the image at the second resolution.

6. The image processor according to claim 1, wherein the image at the first resolution comprises a standard definition format and the image at the second resolution comprises a high definition format.

7. The image processor according to claim 1, wherein the image reconstruction unit is included in at least one of: a digital video disc player, a cable set-top box, a satellite set-top box, a computer, and a television.

8. A method, comprising:
inputting a plurality of pairs of low resolutions and corresponding high resolution training images;
classifying, into a number of classes, a plurality of images patches from corresponding training images to form codebooks and filters for each of the training images;
combining the number of classes into a final class by treating individual codevectors within each class as new image patches;
synthesizing regularized filters corresponding to each of the combined classes into a final regularized filter values using a smoothness term reducing impulse noise artifacts related to unconstrained filter coefficients; and
generating a look-up table containing codebooks for the final class and the final regularized filter values.

9. The method according to claim 8, wherein synthesizing comprises introducing minimization function configured to minimize a cost function, the minimization term comprising:

$$C=\Sigma\rho_1(f(\vec{g}))+\lambda\rho_2(h(\vec{g})),$$

wherein C is a cost function, $\vec{g}$ are filter coefficients, $\rho_1$ is a data term, and $\lambda\rho_2$ is a regularization term, and $\lambda\rho_2(h(\vec{g}))$ is a smoothness term.

10. The method according to claim 8, wherein a plurality of codebooks are combined using codevectors as a second plurality of image patches.

11. The method according to claim 10, wherein the weighted average is based on a distance of a filter from a cluster of filters for the plurality of codebooks to be combined.

12. The method according to claim 8, further comprising:
introducing high frequency details into an image at a first resolution using the look-up table to output the image at a second resolution greater than the first resolution.

13. The method according to claim 12, wherein the image at the first resolution comprises a standard definition format and the image at the second resolution comprises a high definition format.

14. A video processing system, comprising:
a memory configured to store video related information;
processing circuitry configured to process the video related information to render an image, the processing circuitry comprising:
an image reconstruction unit configured to receive an image at a first resolution, to classify image patches from the image into classes, to select a codebook and regularized filters to apply to the image from a look-up table based on classification of the image patches, and to apply the selected codebook and regularized filters to the image to introduce additional image details and output a version of the image at a second resolution without impulse noise artifacts related to unconstrained filter coefficients, wherein the second resolution comprises a higher resolution than the first resolution.

15. The video processing system according to claim 14, wherein look-up table is further generated based on a minimization function configured to minimize a cost function, the minimization term comprising:

$$C=\Sigma\rho_1(f(\vec{g}))+\lambda\rho_2(h(\vec{g})),$$

wherein C is a cost function, $\vec{g}$ are filter coefficients, $\rho_1$ is a data term, and $\lambda\rho_2$ is a regularization term, and $\lambda\rho_2(h(\vec{g}))$ is a smoothness term.

16. The video processing system according to claim 14, wherein the image patches are classified to identify a plurality of codebooks and filters for increasing a resolution of the image, and wherein the lookup table is generating by combining the plurality of codebooks together using codevectors derived based upon a plurality of training images and reclassifying the combined codebooks into a final class.

17. The video processing system according to claim 16, wherein reclassifying the combined codebooks comprises applying a weighted filter average, the weighted filter average based on a distance of a filter from a cluster of filters for the plurality of codebooks to be combined.

18. The video processing system according to claim 14, wherein the image reconstruction unit is configured to introduce high frequency details into the received image to output the image at the second resolution.

19. The video processing system according to claim 14, wherein the image at the first resolution comprises a standard definition format and the image at the second resolution comprises a high definition format.

20. The video processing system according to claim 14, wherein the video processing system comprises at least one of: a digital video disc player, a cable set-top box, a satellite set-top box, a computer, and a television.

* * * * *